United States Patent [19]

Parker

[11] 4,095,148

[45] June 13, 1978

[54] DIRECT CURRENT MOTORS

[76] Inventor: Louis W. Parker, 2408 Sunrise Key Hwy., Fort Lauderdale, Fla. 33304

[21] Appl. No.: 707,578

[22] Filed: Jul. 22, 1976

[51] Int. Cl.$^2$ .......................................... H02K 23/00
[52] U.S. Cl. .................................. 318/138; 318/254; 318/439
[58] Field of Search ........................ 318/138, 254, 439

[56] References Cited

U.S. PATENT DOCUMENTS

| | | | |
|---|---|---|---|
| 3,286,147 | 11/1966 | Parker et al. | 318/138 |
| 3,453,512 | 7/1969 | Polakowski | 318/254 |
| 3,619,746 | 11/1971 | Thornton | 318/439 |
| 3,667,011 | 5/1972 | Casaday et al. | 318/254 |
| 3,831,072 | 8/1974 | Tanikoshi | 318/138 |

*Primary Examiner*—Robert K. Schaefer
*Assistant Examiner*—Michael Mutter
*Attorney, Agent, or Firm*—Pollock, VandeSande and Priddy

[57] ABSTRACT

A direct current motor comprises a stator having a plurality of coils connected in series with one another located around a circle in a closed loop configuration, with the junctions between adjacent pairs of coils being in turn connected to diametrically opposed ones of said junctions in said closed loop configuration. A plurality of pairs of oppositely poled silicon controlled rectifiers are connected respectively to the junctions of different adjacent pairs of the coils for conducting current from a DC source into and out of the junctions. A wound rotor energized by the DC source drives a distributor which is arranged to energize the gate electrodes of different ones of the silicon controlled rectifiers in sequence so as to produce a plurality of stator poles which, at any instant of time, are angularly displaced from the rotor poles, and which stator poles shift in position about the closed loop coil configuration with rotation of the rotor. The rotor further includes a centrifugal switch arrangement operative to achieve one mode of operation when the motor is starting and a different mode of operation when the motor is running. In one form of the invention, the stator coil junctions are energized from the DC source through brushes associated with a commutator driven by the rotor in the starting mode of operation, and the brushes are lifted from the commutator and the silicon controlled rectifiers are controlled by the distributor when the motor shifts into its running mode of operation. In a further embodiment of the invention, the commutator is eliminated and the DC supply is rapidly turned on and off during the starting mode of operation.

17 Claims, 3 Drawing Figures

DIRECT CURRENT MOTORS

BACKGROUND OF THE INVENTION

Direct current motors have been suggested heretofore which employ, inter alia, a commutator and associated brushes. In such arrangements, the brushes require substantially continuous maintenance and, after a period of use, wear out and require replacement. In addition, such motors cannot be practically operated at higher voltages due to the sparking which results at the commutator.

In an effort to avoid some of these difficulties, motors have been suggested heretofore which use solid state elements as commutation devices. Arrangements of this general type are described, for example, in the U.S. Pat. Nos. to Thompson 3,200,315, Hetzel 3,229,179, Kuniyoshi et al. 3,522,499, Thornton et al. 3,619,746, Kuniyoshi 3,749,991, Greenwell 3,753,060 and 3,753,062, Carow 3,766,456, and Bourbeau 3,866,099. While these prior arrangements eliminate some of the known difficulties of brush-type motors, they nevertheless are so constructed that they must operate at low power levels. In contrast, the motor of the present invention has no practical upper power limit and is adapted for use, for example, at voltages in excess of 10,000 volts.

The system of the present invention is adapted for use with motors of various conventional shapes and with magnetic stator structures of various conventional configurations. However the system has been found to exhibit particular advantages when employed in conjunction with an axial airgap motor structure of the type described in my prior U.S. Pat. No. 3,567,978 wherein at least one stator is associated with at least two rotors arranged in an axial airgap type of construction. Such a construction has the advantage of lower weight and higher efficiency, but due to its provision of several rotors would, when operated on direct current as contemplated by the present invention rather than on alternating current as described in said patent, require several commutators or a large number of interconnections between the rotors. The novel construction of the present invention permits the use of axial airgap motors with several rotors without encountering such complications.

Inasmuch as the magnetic structure of the motor used in a preferred embodiment of the present invention is described in my above-identified prior patent, the disclosure of said prior patent is incorporated herein by reference.

The present invention finds particular advantages when employed as the motor power source of an electric motor vehicle due to the fact that substantially all possible trouble caused by wear, dirt, and handling by nontechnical persons, are eliminated.

SUMMARY OF THE INVENTION

The electric motor of the present invention employs silicon controlled rectifiers (SCR's) to carry high currents and voltages, thereby permitting elimination of the commutator and brushes conventionally employed heretofore in direct current motors. A distributor is employed to carry low currents and low voltages operative to control the silicon controlled rectifiers after a certain minimum speed has been achieved. The motor consists mainly of a stator comprising a plurality of coil windings distributed in a manner similar to that employed in the armature windings of a conventional DC motor. In such conventional DC armatures, all coils are in series with one another, and the various segments of an associated commutator are connected to the coil junctions. In the present invention, the stator coils are also connected in series with one another in a closed loop configuration, and connections are brought out from the coil junctions to brushes or SCR's connected in such a manner that current may flow through the stator coils in either direction and into and out of said junctions.

A particularly important aspect of the invention resides in the fact that it is arranged to operate in two different modes, i.e., a starting mode of operation and a running mode of operation. When the motor is being started, and when it is operating a motor vehicle, for example, at very low speed, it uses one mode of operation; but after reaching a speed of substantially four to five revolutions per second, a centrifugally operated switch driven by the rotor transfers the motor to its other, or running, mode of operation.

In one form of the invention, the starting mode of operation employs a commutator driven by the rotor, and associated brushes, for energizing the stator coils to produce a plurality of stator poles which are angularly displaced from the rotor poles thereby to provide a torque on the rotor, with the stator poles shifting in position about the closed loop stator coil configuration as the rotor rotates; and once the motor reaches a certain predetermined speed, determined by the aforementioned centrifugally operated switch, the brushes are lifted from said commutator and an oscillator generating voltage pulses is activated, which functions through a distribution to energize the gate electrodes of pairs of silicon controlled rectifiers. These silicon controlled rectifiers are connected respectively to the stator coil junctions and thereafter function, in the running mode of operation, to effect current flow in opposite directions through different ones of the stator coils.

In a second embodiment of the invention, the running mode of operation and the structure employed therein is the same as that described above, but the starting mode of operation is accomplished in a different fashion. The first-mentioned commutator and its associated brushes are eliminated and, instead, a separate silicon controlled rectifier switching circuit, operated by a second commutator driven by an auxiliary motor, is employed to rapidly turn the main power supply on and off until the motor reaches a certain predetermined speed. When that certain speed is achieved, the centrifugally operated switch de-energizes the auxiliary motor and terminates the main power supply switching operation so that the aforementioned pairs of silicon controlled rectifiers associated with the stator coil junctions are selectively energized from the main power supply under the control of impulses from the distributor.

BRIEF DESCRIPTION OF THE DRAWINGS

The foregoing objects, advantages, construction and operation of the present invention will become more readily apparent from the subsequent description and accompanying drawings wherein.

DESCRIPTION OF THE PREFERRED EMBODIMENTS

The direct current motor of the present invention comprises a stator consisting of a plurality of stator coils connected in series with one another in a closed loop configuration, a wound rotor mounted for rotation adjacent the stator, and a direct current source which is used to energize the windings of both the rotor and the stator. The arrangement employed is such that current flowing from the direct current source through the rotor operates in conventional fashion to generate a plurality of rotor poles, and current flow from the source through the stator coils also operates to produce a plurality of stator poles which are angularly displaced from the rotor poles so as to effect a torque therebetween operative to effect rotation of the rotor relative to the stator. The rotor includes at least one pulse distributor which is employed to control the manner in which the stator coils are energized so that, as the rotor rotates, th stator poles shift in position about the closed loop stator coil configuration to maintain angular displacement between the rotor and stator poles.

Figure 1:
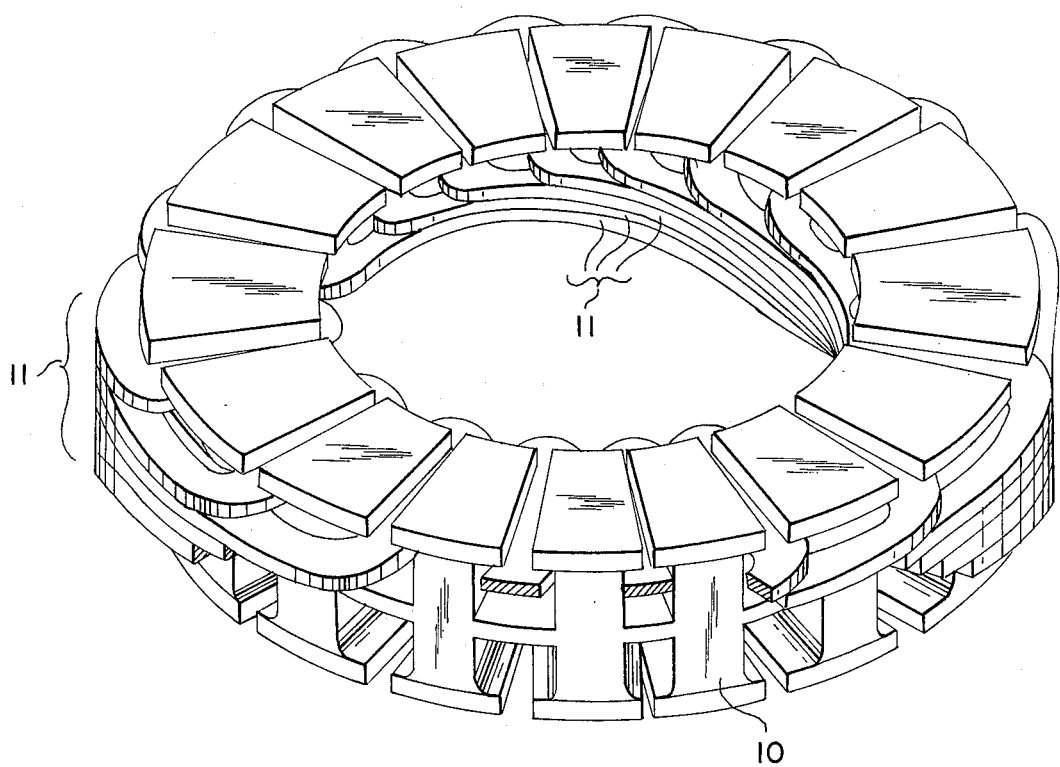
FIG. 1 is a perspective representation of the stator of a motor constructed in accordance with the present invention.

FIG. 1 illustrates the general structure of the stator employed in the motor of the present invention. The stator includes a laminated iron core 10 which supports sixteen coils 11, although a different number may be employed. Some of the coils have been cut in the illustration of FIG. 1 to reveal the construction of the laminated iron core. All coils are wound in the same direction of rotation, and they are connected in series with one another.

Figure 2:
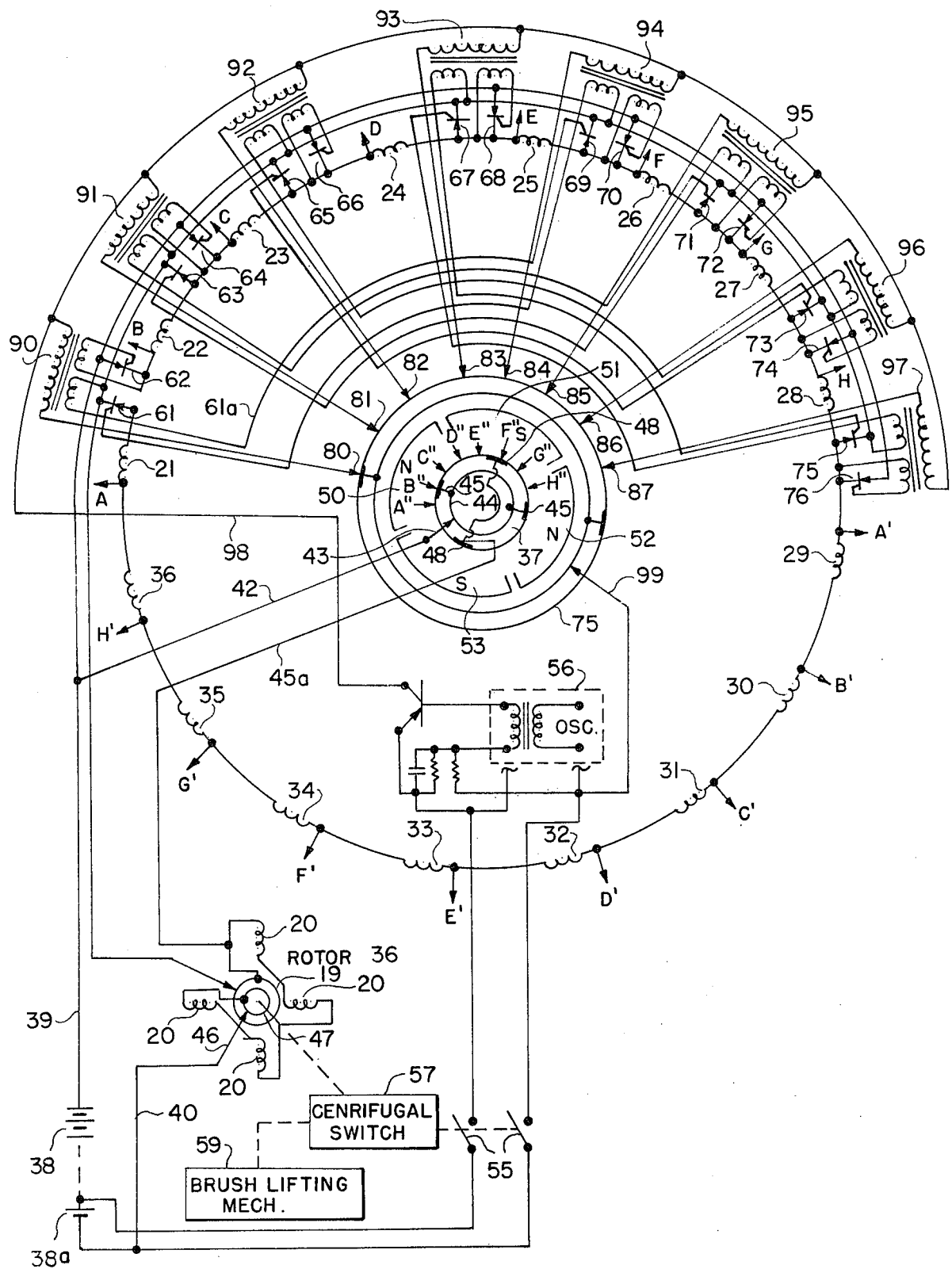
FIG. 2 illustrates in schematic form a direct current motor constructed in accordance with the present invention and employing a stator of the type shown in FIG. 1.

The sixteen stator coils are diagrammatically illustrated in FIG. 2, and are designated as coils 21 through 36. As shown in FIG. 2, the stator coils are mounted around a circle and are connected in series with one another in a closed loop configuration. When the motor is operated, the positive terminal of the direct current power supply 38 is connected through brushes or SCR's to the opposite ends of a diameter on this coil circle, and the negative terminal of the power supply 38 is connected by similar means to the ends of a second diameter on the coil circle which second diameter is located at right angles to the first diameter. As a result, four poles are formed on the stator which interact with four poles on an associated rotor 36, and which are angularly displced therefrom, to create a torque therebetween.

More particularly, as designated by terminals A-H inclusive and A'-H' inclusive, a connection is brought out from the junction between each adjacent pair of coils. The connections A, B, C, D, E, F, G, and H are located on one half of the stator coil array, and the connections A', B', C', D', E', F', G', and H' are located on the other half of said array. The junctions having the same letters are interconnected to one another, i.e., junction A is connected to A', B is connected to B', etc.; these connections have not been shown in FIG. 2 in order to simplify the drawing.

The rotor 36 associated with the aforementioned stator coil array is of would configuraton and comprises four coils 20 which are connected in series with one another between slip rings 19 and 47. It is of course possible to employ permanent magnets in the rotor in place of electromagnets. This eliminates the copper losses in the rotor, thereby improving the efficiency of the motor. This feature can be important when a storage battery is used as the power supply. However the use of presently available permanent magnets reduces the power of the motor.

The rotor shaft supports a four-segment commutator 37 and a two-segment pulse distributor 75. Commutator 37 is associated with a further plurality of brushes A" through H" which are also connected to the junctions of like letter, i.e., brush A" is connected to interconnected jundtions A-A', etc. The positive terminal of battery supply 38 is connected to commutator 37 through lead 42, brush 43, slip ring 44, and segments 45, and the negative terminal of battery supply 38 is connected to the commutator 37 via brush 46, the inner slip ring 47 of rotor 36, the series connected coils 20 of the rotor, outer slip ring 19, and lead 45a where current exits from the rotor, to a pair of diametrically opposed negative segments 48 in commutator 37. Inasmuch as rotor 36 and commutator 37 are rotating together, lead 45a can connect directly from the negative output lead of rotor 36 to the negative segments 48 of commutator 37 without requiring a slip ring.

In the position of the various elements shown in FIG. 2, brush B" of commutator 37 is in engagement with a positive segment 45 of said commutator whereby the positive terminal of power supply 38 is connected, through brush B", to junction B between stator coils 21 and 22, and to junction B" between stator coils 29 and 30. Brush F" is at this time in engagement with a negative commutator segment 48 whereby the negative side of power supply 38 is connected to junction F between stator coils 25 and 26, and to junction F" between stator coils 33 and 34. Accordingly, current will flow in a clockwise direction from junction B to junction F, in a counterclockwise direction from junction B to junction F', in a clockwise direction from junction B' to junction F', and in a counterclockwise direction from junction B' to junction F. As a result, four magnetic poles are formed in the stator.

The current which flows through the stator coils to form the aforementioned four poles also passes through coils 20 of rotor 36 which are connected in series with the stator coils. Four magnetic poles are accordingly also formed on the rotor, and in order to indicate the position of these four rotor poles relative to the aforementioned stator poles at the moment when brushes B" and F" are conducting current, the four rotor poles have been designated 50 through 53 inclusive around commutator 37. One of the stator poles was, as described above, formed by coils 22 through 25, and the center of this stator pole is located between coils 23 and 24. The gap between rotor North pole 50 and rotor South pole 51 falls in line with the middle of the center of the stator pole formed by stator coils 22-25, and a similar relationship will be observed with respect to the other rotor poles and the stator poles with which they are associated. As a result, the centers of the stator and rotor poles are angularly displaced from one another by 45° and, assuming the proper polarities, the magnetic attraction between the stator and rotor poles will tend to reduce this gap thereby creating a torque in the clockwise direction of the rotor shaft.

Assuming that the rotor 36 is permitted to yield to the torque so formed, and as a result rotates clockwise, there will be a short time when both of brushes B" and C" will conduct current to the stator coils. After this very short time, brushes B" will leave segment 45 on commutator 37, and brush C" will take over the function of conducting current to the stator coils. At the same time, brush G" will take over the function of brush F". When this occurs, the center of the magnetic pole on the stator will shift 22.5° in a clockwise direction, and the associated rotor pole will accordingly be attracted further in a clockwise direction. This in turn, by a similar sequence of operations, will cause brushes C" and H" to become operational, etc.

The action described above becomes continuous until a certain minimum speed of roation is reached, at which time the motor is switched into its running mode of operation. This minimum speed may be five revolutions per second in a 3600 rpm motor. However the minimum speed actually selected may vary greatly depending mainly on the type of use to which the motor is applied. When this certain minimum speed is reached, a centrifugally operated switching device 57 driven by the rotor 36 closes a switch 55 to supply energization from a portion 38a of the direct current power supply to pulse oscillator 56 thereby energizing that oscillator, and, at the same time, operates through mechanical means 59 to lift brushes A" through H" from commutator 37. The commutator 37 is thus de-activated, and a plurality of silicon controlled rectifiers which are selectively energized in sequence from oscillator 56 through the aforementioned pulse distributor 75, assumes the function of brushes A" through H" during the subsequent running mode of operation.

More particularly, a plurality of silicon controlled rectifiers 61-76, grouped in oppositely poled pairs (61, 62; 63, 64; etc.) are connected as shown to each of the aforementioned stator coil junctions, and operate to assme the function of conducting current to and from the stator coils 21-36 when the motor assumes its running mode of operation and brushes A"-H" are lifted from commutator 37. The function previously performed by each of brushes A" through H" is assumed by the SCR's 61-76 except that a pair of oppositely poled SCR's is needed to perform the function previously performed by a single brush in order that current may be caused to flow in both directions to and from a given coil junction as described previously. The control electrodes of the sixteen SCR's are operated respectively by sixteen separate secondary windings provided on eight transformers 90-97. One side of the primary windings of said trnsformers 90-97 are interconnected to one another and thence via lead 98 to one side of pulse oscillator 56, whereas the other sides of the primary windings of transformers 90-97 are individually connected to and energized by brushes 80-87 respectively which ride on the two-segment distributor 75 the slip ring of which is connected via brush 99 to the other side of the oscillator 56 output. Inasmuch as each of the transformers 90-97 has two secondary windings, the two SCR's associated with any given transformer and operating to conduct the current to and from the stator coils at any given time, are turned on simultaneously without requiring an extra brush.

More particularly, when the primary winding of transformer 90 is energized from pulse oscillator 56 through distributor 75 via brush 80, one of the transformer secondary windings turns on SCR 62 thereby connecting the positive terminal of DC supply 38 to the junction B-B'. The other secondary winding of transformer 90 is connected through line 61a to the gate electrode of SCR 69 and, as a result, SCR 69 is rendered conductive to effectively connect junction F-F' to the negative terminal of supply 38. In similar fashion, as the rotor continues to rotate distributor 75, each of the other brushes 81 through 87 will, in proper sequence, open up both positive and negative conducting paths to the proper junctions of the several stator coils.

Each of the transformers 90-97 supplies less than one watt of average power to about five kc for a motor having a rating up to 50 HP, and the transformers can therefore be very small. The primaries of the transformers 90-97 are connected to oscillator 56 in proper time by brushes 80-87 and associated distributor 75; the brushes 80-87 can also be very small and do not encounter the sparking problems or the like described previously inasmuch as they are required to carry out a fraction of an ampere.

After the motor has reached a certain minimum speed, it will continue to run at any other higher speed without special provision to break off conduction of SCR's 61 through 76. The reason for this is that the counter EMF goes through a substantially zero voltage position in the coil that is being shut off and, in addition, the new current path opened by an SCR which has just been turned on will produce a resultant inductive surge which operates to render a previously conductive SCR nonconductive. For a further discussion of these phenomena, reference is made to my prior U.S. Pat. No. 3,895,273 issued July 15, 1975, for "Direct Current Energized Synchronous Motor System".

The motor shown in FIG. 2 will not start without some special starting provision such as commutator 37 and brushes A" through H" due to the fact that the various SCR's will not break off conduction unless the current through them is interrupted for a short time. A technique for starting the motor which is simpler than the commutator/brush arrangement described in reference to FIG. 2, is one that periodically interrupts the current from the main power supply 38. The proper SCR's are turned on by pulse oscillator 56 resulting in a small angular movement of the rotor 36, but this movement will cease if the SCR's are left conducting during the starting mode of operation. If, however, there is a break in the current for a short time (at least 200 microseconds) the conducting SCR's will be rendered nonconductive and, since the rotor will have turned a fraction of a revolution, new SCR's will become operative thereby causing the rotor to turn further. In this way, if there are several short time breaks of the current per second, the motor will start and, after reaching a certain speed, will continue to run without further interruption of the main power supply.

In an operation of this latter type, it is possible to limit the duration of the breaks in the power supply energization to less than 10% of the "on" time at low speed, and the torque of the motor is therefore not materially affected by such breaks. When this latter mode of starting is employed, the commutator 37, slip ring 44, brush lifting mechanism 59, brush 43, and brushes A" through H" can be eliminated, leaving only the two segment pulse distributor 75 and its associated brushes 80-87. This greatly simplifies the construction of the motor, but the performance at very low speeds is not quite as smooth as the commutator and brush method of starting described previously with respect to FIG. 2.

Figure 3:
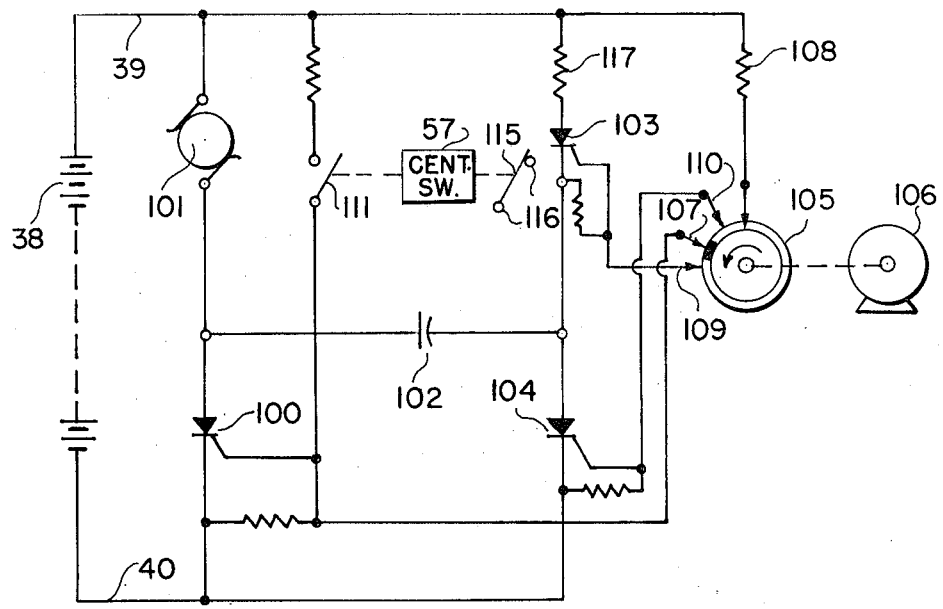
FIG. 3 is a schematic illustration of the motor shown in FIG. 2, employing a different arrangement for starting the motor.

FIG. 3 illustrates in diagrammatic form a modified FIG. 2 circuit of the type described above which embodies an alternative starting circuit operative to periodically interrupt the output of the main power supply during the starting mode. Power supply 38 and its output leads 39, 40 shown in FIG. 3 correspond to the like elements previously described in reference to FIG. 2, and the motor circuit of FIG. 2 connected between lines 39, 40 (without commutator 37, however, and its associated elements) has been designated 101 in FIG. 3.

A switching mechanism operative to periodically interrupt the output of the power supply is disposed in series with the power supply and, in the embodiment shown in FIG. 3, takes the form of SCR 100 which is inserted into the lead between the negative side of the power supply and the motor. SCR 100 is in turn associated with two other SCR's 103, 104, and with an intervening capacitor 102, interconnected to one another in the manner shown in FIG. 3. The gate electrodes of SCR's 100, 103, 104 are connected respectively to brushes 107, 109, 110 which ride on a single segment commutator 105 that is driven by an auxiliary motor 106 operative to rotate commutator 105 at a speed in the order of 10 revolutions per second. The slip ring of commutator 105 is connected via resistor 108 to the positive side of power supply 38.

In the position of the elements illustrated in FIG. 3, brush 107 is in engagement with the segment of commutator 105 whereby the gate electrode of SCR 100 is energized from power supply 38 through resistor 108 and commutator 105. SCR 100 is accordingly rendered conductive to connect power supply 38 across the motor circuit 101.

As motor 106 rotates commutator 105 in a counterclockwise direction as shown, the commutator segment will leave brush 107 and move into engagement with brush 109. Since SCR 100 is already conducting, it will continue to conduct even though its gate electrode is no longer being energized. The gate electrode of SCR 103 will, however, now become energized through brush 109 causing current to flow through SCR 103 and SCR 100 via capacitor 102 so as to charge capacitor 102. After a short period of time, determined in part by the magnitude of current limiting resistor 117, capacitor 102 will become fully charged and no further current will flow through SCR 103.

As the commutator 105 continues to rotate, the commutator segment will move away from brush 109 into engagement with brush 110, connecting the positive side of the power supply 38 to the gate electrode of SCR 104, causing SCR 104 to commence conduction. When SCR 104 conducts, capacitor 102 will discharge, and the current which was previously conducted through SCR 100 will be taken over momentarily by current flow through capacitor 102. At the same time, the discharge of capacitor 102 will momentarily reverse the polarity of the potential across SCR 100. As a result, SCR 100 will be rendered nonconductive, and the connection between the power supply 38 and motor 101 will be interrupted. The continued rotation of commutator 105 will thereafter bring its conductive segment into engagement with brush 107 energizing the gate electrode of SCR 100, causing SCR 100 to recommence conduction, and the entire process will be completed.

In this way, as auxiliary motor 106 continues to rotate, SCR 100 will be periodically cut off and thereafter rendered conductive once more so as, in effect, to rapidly turn the main power supply on and off relative to the motor 101. The brushes on commutator 105 are so located that maximum time is allowed to charge capacitor 102. As a result, lower charging current is used.

After the speed of motor 101 increases sufficiently, a centrifugal device 57 operationally similar to the correspondingly numbered device described with reference to FIG. 2 closes switch 111 to provide direct connection between power supply 38 and the gate electrode of SCR 100, whereby SCR 100 will conduct continuously and, at the same time, device 57 will open switch 115 which is associated with terminals 116 in the energization circuit of auxiliary motor 106 so as to turn the auxiliary motor off. The overall motor system will then be in its running mode of operation, and will thereafter function in the fashion previously described with reference to FIG. 2.

In an arrangement of the type shown in FIG. 3, power will be connected to motor 101 over 90% of the time, resulting in a drop of less than 10% in the starting torque of the motor. The technique of rapidly turning the main power supply on and off is simpler and cheaper than the brush and commutator starting method of operation described in reference to FIG. 2, but is slightly less effective for use in electric cars.

While I have thus described preferred embodiments of the present invention, many variations will be apparent to those skilled in the art, and it must therefore be understood that the foregoing description is intended to be illustrative only and not limitative of the present invention. For example, the principle of starting the motor by repeated breaking of the current supply can be accomplished by other circuit breaking arrangements including a variety of nonmechanical switching circuits employing transistors and/or SCR's, and is not limited to the precise starting circuit arrangement shown in FIG. 3. Other variations will be apparent to those skilled in the art, and all such variations as are in accord with the principles described are meant to fall within the scope of the appended claims.

Having thus described my invention, I claim:

1. A direct current motor comprising a stator consisting of a plurality of coils connected in series with one another in a closed loop configuration, means connecting the junction between adjacent pairs of said coils to diametrically opposed ones of said junctions in said closed loop coil configuration, a plurality of pairs of oppositely poled silicon controlled rectifiers connected respectively to the junctions of different adjacent pairs of said coils for selectively conducting current into and out of said stator coil junctions, a direct current source for energizing each of said pairs of silicon controlled rectifiers, a rotor mounted for rotation adjacent said stator, means including a distributor driven by said rotor for energizing the gate electrodes of different ones of said silicon controlled rectifiers in sequence thereby to produce a plurality of stator poles which are angularly displaced from the rotor poles and which stator poles shift in position about said closed loop coil configuration with rotation of said rotor, centrifugal switch means coupled to said rotor, and control means responsive to the operating state of said centrifugal switch means for controlling the possible conduction of said silicon controlled rectifiers to effect a starting mode of operation when said rotor is rotating below a predetermined speed and to effect a running mode of operation different from said starting mode when said rotor is rotating above said predetermined speed, said centrifugal switch means and said control means being operative to prevent continuous conduction of any of said silicon controlled rectifiers in said starting mode of operation and being operative to permit continuous conduction of different successive ones of said pairs of rectifiers in said running mode of operation.

2. The motor of claim 1 wherein said rotor is a wound rotor, said direct current source being connected through the windings of said rotor to each of said pairs of silicon controlled rectifiers.

3. The motor of claim 1 wherein said rotor comprises a plurality of permanent magnets.

4. The motor of claim 1 including an oscillator coupled to said distributor for energizing the gate electrodes of different ones of said silicon controlled rectifiers in dependence upon the position of said rotor.

5. The motor of claim 4 wherein said centrifugal switch means and said control means are operative to energize said oscillator in said running mode of operation and are operative to deenergize said oscillator in said starting mode of operation.

6. The motor of claim 5 including a commutator driven by said rotor, means connecting said direct current source to said commutator, a plurality of brushes on said commutator connected respectively to different ones of said stator coil junctions for energizing said stator coils from said source through said commutator in said starting mode of operation, said control means including means for lifting said brushes away from said commutator in said running mode of operation.

7. The motor of claim 1 including a switch disposed between said direct current source and said pairs of silicon controlled rectifiers, said control means including means operative to periodically open and close said switch when said motor is in said starting mode of operation thereby to periodically interrupt the energization of said silicon controlled rectifiers in said starting mode, said control means being operative to maintain said switch closed in said running mode of operation.

8. The motor of claim 7 wherein said switch comprises a further silicon controlled rectifier, said control means being operative to render said further silicon controlled rectifier periodically conductive and nonconductive in said starting mode.

9. The motor of claim 8 wherein said further silicon controlled rectifier is rendered nonconductive for no greater than 10% of the time that said rectifier is rendered conductive in said starting mode.

10. The motor of claim 8 wherein said control means includes an auxiliary motor, a commutator driven by said auxiliary motor, circuit means for controlling energization of the gate electrode of said further silicon controlled rectifier through said commutator in said starting mode, and means responsive to said centrifugal switch means for disabling said auxiliary motor and for supplying continuous energization to the gate electrode of said further silicon controlled rectifier in said running mode of operation.

11. The motor of claim 1 including a plurality of transformers each of which has at least one primary winding and at least two secondary windings, said distributor having a plurality of brushes thereon corresponding to said plurality of transformers, the secondary windings in each of said transformers being connected respectively to a pair of said oppositely poled rectifiers, and the primary winding of each of said transformers being connected via one of said brushes to said distributor for energization in dependence upon the angular position of said distributor.

12. The motor of claim 11 wherein one side of each of said primary windings is connected to one of said brushes respectively, means interconnecting the other sides of said primary windings to one another, and an oscillator having its output connected between said distributor and the interconnected other sides of said primary windings.

13. The motor of claim 12 wherein said centrifugal switch means includes means operative to complete an energization circuit between said oscillator and at least a portion of said direct current source when said motor is in said running mode of operation, and operative to interrupt said energization circuit thereby to de-energize said oscillator in said starting mode of operation.

14. The motor of claim 1 wherein said centrifugal switch means is operative to complete an energization circuit between said direct current source and said pairs of silicon controlled rectifiers in said running mode of operation, and is operative to regularly interrupt said energization circuit in said starting mode of operation.

15. The motor of claim 1 wherein said control means includes a rotary commutator disposed between said direct current source and said stator, said centrifugal switch means being connected to render said commutator operative in said starting mode and to disable said commutator in said running mode.

16. The motor of claim 15 wherein said commutator is rotated by said rotor.

17. The motor of claim 15 wherein said commutator is rotated by an auxiliary motor.

* * * * *